United States Patent
Wang et al.

(10) Patent No.: US 12,203,881 B2
(45) Date of Patent: Jan. 21, 2025

(54) METHOD OF DETECTING INTERNAL STRESS DISTRIBUTION OF TRANSPARENT MATERIAL BASED ON X-RAY DIFFRACTION

(71) Applicant: Zhejiang University, Hangzhou (CN)

(72) Inventors: Haikuo Wang, Hangzhou (CN); Yao Tang, Hangzhou (CN); Jiakun Wu, Hangzhou (CN); Xiaoping Ouyang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/645,280

(22) Filed: Apr. 24, 2024

(65) Prior Publication Data
US 2024/0345007 A1    Oct. 17, 2024

(30) Foreign Application Priority Data
Apr. 27, 2023 (CN) .......................... 202310468822.1

(51) Int. Cl.
*G01N 23/2005* (2018.01)
*G01N 23/20* (2018.01)
(Continued)

(52) U.S. Cl.
CPC ......... *G01N 23/2055* (2013.01); *G01N 23/20* (2013.01); *G01N 23/207* (2013.01);
(Continued)

(58) Field of Classification Search
CPC .. G01N 23/20; G01N 23/2005; G01N 23/205; G01N 23/2055; G01N 23/207;
(Continued)

(56) References Cited

U.S. PATENT DOCUMENTS 3,030,507 A * 4/1962 Khol .................... G01N 23/207
378/72
4,686,631 A * 8/1987 Ruud ................... G01N 23/207
378/72
(Continued)

FOREIGN PATENT DOCUMENTS

CN         102169033 A      8/2011
CN         103499405 A      1/2014
(Continued)

OTHER PUBLICATIONS

An English translation of CN110243510A by Patent Translate (Year: 2024).*

(Continued)

*Primary Examiner* — Allen C. Ho

(57) ABSTRACT

A method of detecting internal stress distribution of a transparent material based on X-ray diffraction, which includes the following steps. Coordinates of stress detection positions of a transparent material are established. An initial powder of the transparent material and a standard reference material are processed. A placement coordinate position of the standard reference material on the transparent material is calculated. A standard reference material-containing transparent material is synthesized. Internal stress of the standard reference material is detected as the internal stress of the transparent material at the placement coordinate position.

5 Claims, 4 Drawing Sheets

(51) Int. Cl.
  *G01N 23/205* (2018.01)
  *G01N 23/2055* (2018.01)
  *G01N 23/207* (2018.01)
(52) U.S. Cl.
  CPC ............... *G01N 2223/0568* (2013.01); *G01N 2223/1016* (2013.01)
(58) Field of Classification Search
  CPC ..... G01N 2223/056; G01N 2223/0561; G01N 2223/0563; G01N 2223/0566; G01N 2223/0568; G01N 2223/1016; G01N 2223/602; G01N 2223/607
  USPC ...................................... 378/70–90
  See application file for complete search history.

(56) References Cited

U.S. PATENT DOCUMENTS

| | | | | |
|---|---|---|---|---|
| 4,918,711 A | * | 4/1990 | Berman | G01L 1/25 378/72 |
| 4,959,548 A | * | 9/1990 | Kupperman | G01N 23/2073 250/390.08 |
| 6,033,768 A | * | 3/2000 | Muenz | C23C 14/0641 204/192.1 |
| 7,889,840 B2 | * | 2/2011 | Vasudevan | G07C 3/14 378/70 |
| 11,078,596 B2 | * | 8/2021 | Nakabayashi | G01N 23/207 |
| 12,099,025 B2 | * | 9/2024 | Zheng | G01N 23/20008 |

FOREIGN PATENT DOCUMENTS

| | | | | |
|---|---|---|---|---|
| CN | 103499405 B | * | 7/2015 | ............... G01L 1/24 |
| CN | 110243510 A | | 9/2019 | |
| CN | 113063534 A | | 7/2021 | |
| CN | 113433150 A | | 9/2021 | |
| CN | 115931934 A | | 4/2023 | |
| JP | H08320264 A | | 12/1996 | |
| JP | 2009097937 A | | 5/2009 | |

OTHER PUBLICATIONS

An English translation of CN103499405B by Patent Translate (Year: 2024).*

* cited by examiner

METHOD OF DETECTING INTERNAL STRESS DISTRIBUTION OF TRANSPARENT MATERIAL BASED ON X-RAY DIFFRACTION

CROSS-REFERENCE TO RELATED APPLICATIONS

This application claims the benefit of priority from Chinese Patent Application No. 202310468822.1, filed on Apr. 27, 2023. The content of the aforementioned application, including any intervening amendments thereto, is incorporated herein by reference in its entirety.

TECHNICAL FIELD

This application relates to internal stress detection, and more specifically to a method of detecting internal stress distribution of a transparent material based on x-ray diffraction.

BACKGROUND

Internal stress is one of the important factors affecting the macroscopic mechanical properties of materials, and is also the main cause of defects, such as cracks and fractures, during the manufacturing process of materials. Especially in the preparation process of transparent, and hard and brittle materials represented by diamond, quartz and alumina, the detection and regulation of internal stress in materials is key to ensure the quality of the products. X-ray diffraction is a nondestructive testing method to accurately assess the level of stress in materials, but it can not be applied to transparent materials (i.e., diamond and quartz) that contain light elements. How to apply the X-ray diffraction to detect the internal stress of transparent materials is of great significance for the performance analysis and efficient preparation of the transparent materials Previous studies have demonstrated that the measurement of internal stress distribution in transparent materials through X-ray diffraction method is a great engineering challenge since it needs to satisfy the requirements of high measurement accuracy, accurate measurement of spatial location and convenient measurement operation. Considering that the internal stress level at any position within a transparent material is the same as the pressure load of the standard reference material at such position, a non-transparent material is embedded at the stress detection position of the transparent material, and is determined by X-ray diffraction for the pressure load, such that the internal stress level of the transparent material at that position can be evaluated, which demonstrates the feasibility of non-destructive measurement of the internal stress distribution in the transparent materials.

Chinese patent application No. 201910467577.6 discloses a stress detection apparatus for a new-type transparent material, which determines the specific state of the stress of a to-be-detected product by observing its spectral characteristics above the polarizer group. Chinese patent application No. 201310479186.9 discloses a residual stress detection device and method for transparent plastic products. Based on the fact that for three monochromatic LED light sources with different wavelengths, under the same principal stress difference, the product of each wavelength $\lambda$ with the stress fringe value N at this wavelength is equal, the stress fringe value under a certain wavelength can be calculated.

However, none of the above methods mentions how to apply X-ray diffraction to the detection of stress distribution in a transparent material.

SUMMARY

An objective of the present disclosure is to provide a method of detecting internal stress distribution of a transparent material based on X-ray diffraction to overcome the deficiencies in the prior art. The method provided herein can greatly improve the detection position accuracy of the X-ray diffraction detection method.

Technical solutions of the present disclosure are described below.

This application provides a method of detecting internal stress distribution of a transparent material based on X-ray diffraction, comprising:

(S1) establishing coordinates of stress detection positions of a transparent material;

(S2) pre-processing an initial powder of the transparent material and a standard reference material;

(S3) calculating a placement coordinate position of the standard reference material on the transparent material;

(S4) synthesizing a standard reference material-containing transparent material; and (S5) detecting a pressure of the standard reference material in the standard reference material-containing transparent material using X-ray diffraction as an internal stress of the standard reference material-containing transparent material at $P_i$.

In some embodiments, step (S1) is performed through steps of:

establishing a spatial rectangular coordinate system o-x-y-z with an origin o being located at a surface of the transparent material, wherein the number of the stress detection positions is n; and under the spatial rectangular coordinate system, coordinates of an $i^{th}$ stress detection position $P_i$ are represented by ($x_i$, $y_i$, $z_i$), wherein i=1, 2, 3, . . . , n.

In some embodiments, in step (S2), the initial powder of the transparent material and the standard reference material are pre-processed through steps of: processing the initial powder of the transparent material and the standard reference material respectively with an anhydrous ethanol, followed by removal of waste liquid and drying.

In some embodiments, the transparent material is selected from the group consisting of diamond, quartz, aluminum oxide and stishovite.

In some embodiments, the standard reference material is selected from the group consisting of ruby, platinum and gold.

In some embodiments, a volume of the standard reference material is 1 $\mu m^3$-1 $mm^3$.

In some embodiments, step (S3) is performed through steps of:

placing the initial powder of the transparent material in a synthesis mold; and determining, using an Archimedes drainage method, a volume $V_1$ of the initial powder of the transparent material contained in the synthesis mold and a volume $V_2$ of the transparent material after being sintered, wherein a sintering shrinkage of the transparent material is expressed by:

$$\alpha = \frac{V_2}{V_1};$$

and
  setting the placement coordinate position of the standard reference material $B_i$ at the stress detection position $P_i$ as $P_i^f$, expressed by $(X_i, Y_i, Z_i)$; wherein $X_i = \alpha/x_i$, $Y_i = \alpha/y_i$, and $Z_i = \alpha/z_i$.

In some embodiments, step (S4) is performed through steps of:
  loading the initial powder of the transparent material and the standard reference material in the synthesis mold, wherein the standard reference material $B_i$ is located at $P_i^f$; and transferring the synthesis mold to a sintering device for sintering to synthesize the standard reference material-containing transparent material.

In some embodiments, step (S5) is performed through steps of:
  determining a pressure load of the standard reference material $B_i$ located at the stress detection position $P_i$ in the standard reference material-containing transparent material as the internal stress of the standard reference material-containing transparent material at the stress detection position $P_i$; and
  measuring a spectrum of the standard reference material $B_i$ located at the stress detection position $P_i$ on the standard reference material-containing transparent material using an X-ray diffractometer, wherein a corresponding shifted peak position is represented by $l_1^{Pi}$; measuring a spectrum of the standard reference material $B_i$ using the X-ray diffractometer, wherein a corresponding original peak position is represented by $l_2^{Pi}$; and calculating the internal stress $p_{Pi}$ of the standard reference material-containing transparent material at the stress detection position $P_i$ through the following formula:

$$p_{Pi} = |(l_2^{Pi} - l_1^{Pi})| \times \beta_i;$$

wherein $\beta_i$ represents a linear shift of an original peak of the standard reference material $B_i$ under unit pressure.

Compared with the prior art, the present disclosure has at least the following advantages.

(1) The present application applies the X-ray diffraction method for stress measurement to transparent materials.

(2) The method provided by the present disclosure can obtain the internal stress value at any position inside the transparent material, which significantly improves the measurement position accuracy of the X-ray diffraction measurement method.

(3) The present disclosure has a wide range of applications and can detect the stress distribution inside transparent materials with any size.

DETAILED DESCRIPTION OF EMBODIMENTS

The present disclosure is described in detail below with reference to the accompanying drawings and embodiments. It should be noted that the embodiments are the further illustration of the present disclosure, and should not be construed as limitations on the scope of protection of the present disclosure. Non-essential improvements and adjustments can be made by one of ordinary skill in the art according to the technical solutions of the present disclosure.

In this embodiment, a transparent material 1 to be detected is a diamond cylinder with a height of 3 mm and a diameter of 2 mm. A standard reference material 2 is sphere made of platinum (Pt) with a diameter of 0.1 mm. A synthesis mold 3 is a molybdenum cup.

A method of detecting internal stress distribution of a transparent material based on X-ray diffraction, which includes the following steps.

(S1) Coordinates of stress detection positions of a transparent material are established.

Figure 1:
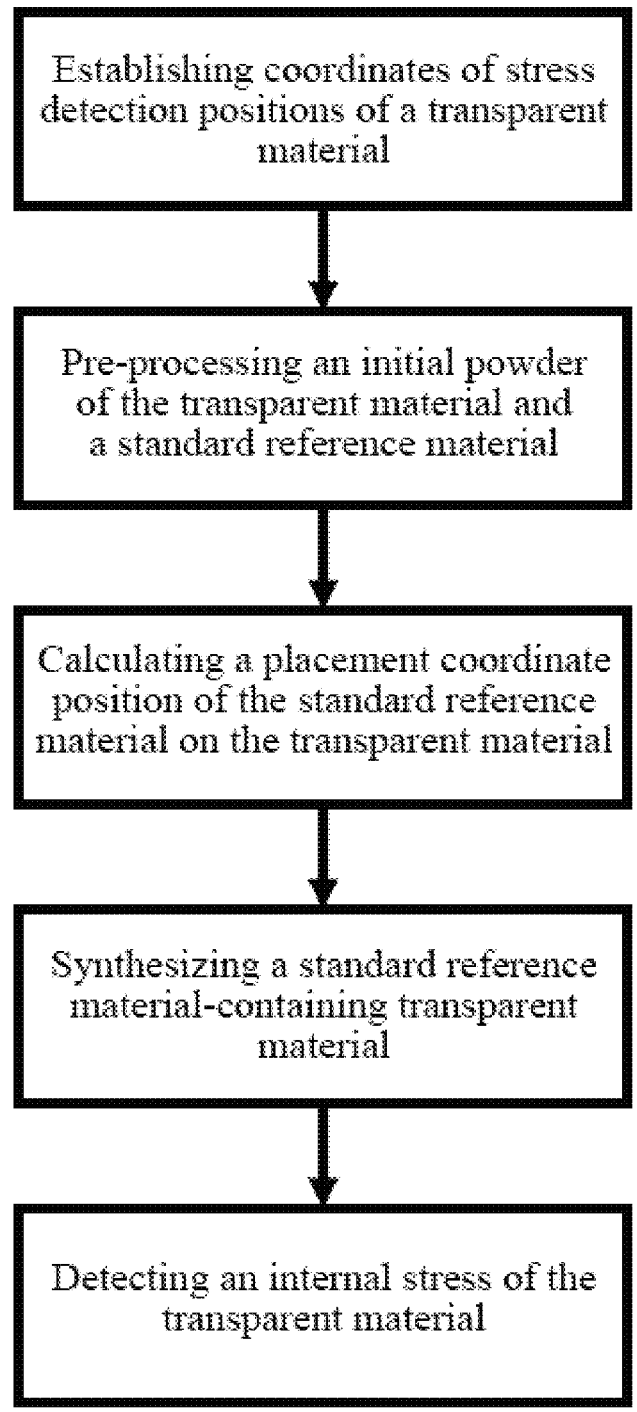
FIG. 1 is a flow chart of a method of detecting internal stress distribution of a transparent material based on X-ray diffraction according to an embodiment of the present disclosure.
Figure 2:
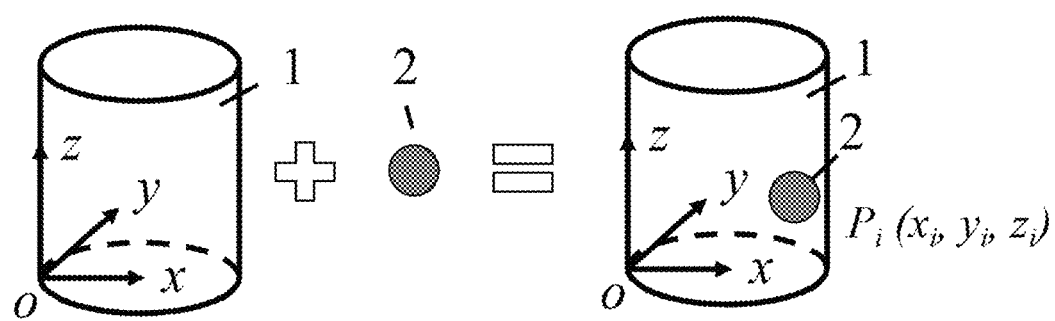
FIG. 2 schematically shows coordinates of stress detection positions of a transparent material according to an embodiment of the present disclosure.

As shown in FIG. 2, for the transparent material 1, a spatial rectangular coordinate system is established as o-x-y-z, where the origin o is set at an edge of a lower surface of the transparent material 1 (diamond cylinder); the coordinate axis x direction is along the direction of the line connecting the origin o and the center of the lower surface of the transparent material 1; the coordinate axis z is parallel to the axis of the transparent material 1, and points to the upper surface of the transparent material 1; and the coordinate axis y is orthogonal to the coordinate axes x and z direction, and meets the right-hand rule of the spatial rectangular coordinate system o-x-y-z.

$P_i$ is a detection coordinate position of an $i^{th}$ standard reference material 2. $X_i$, $Y_i$ and $Z_i$ respectively are x coordinate value, y coordinate value and z coordinate value of the detection coordinate position $P_i$. The standard reference material 2 placed at the stress detection coordinate position $P_i$ is set as $B_i$.

In this embodiment, the number of stress detection positions is 3. Under the established rectangular coordinate system, coordinates of a first stress detection coordinate position $P_1$, a second stress detection coordinate position $P_2$ and a third stress detection coordinate position $P_3$ are (1, 0, 0.5), (1, 0, 1) and (1, 0, 1.5), respectively. The standard reference materials 2 placed at the stress detection coordinate position $P_1$, $P_2$ and $P_3$ are set as $B_1$, $B_2$ and $B_3$, respectively.

(S2) An initial powder of the transparent material and a standard reference material are processed.

The initial material to be processed included an initial powder of the transparent material 1 (98% purity, average grain size of 15 m) and three spherical standard reference materials 2 (99.99% purity). The initial powder of the transparent material 1 and the three standard reference materials 2 were treated with anhydrous ethanol, followed by removal of waste liquid and drying.

(S3) A placement coordinate position of the standard reference material on the transparent material is calculated.

The initial powder of the transparent material 1 was placed in a synthesis mold 3 (molybdenum cup). The volume $V_1$ of the initial powder of the transparent material 1 contained in the synthesis mold 3 was 10.467 mm², and the volume $V_2$ of the transparent material 1 after being sintered was 9.42 mm², which were determined using the Archimedes drainage method. The sintering shrinkage of the transparent material 1 was calculated as:

$$\alpha = \frac{9.42}{10.467} = 0.9.$$

The placement position coordinates of the standard reference materials $B_1$, $B_2$ and $B_3$ at the stress detection coordinate positions $P_1$, $P_2$ and $P_3$ respectively are $P_1^f$, $P_2^f$ and $P_3^f$, with the corresponding coordinates of (1.11, 0, 0.56), (1.11, 0, 1.11), and (1.11, 0, 1.67).

(S4) A standard reference material-containing transparent material is synthesized.

Figure 3:
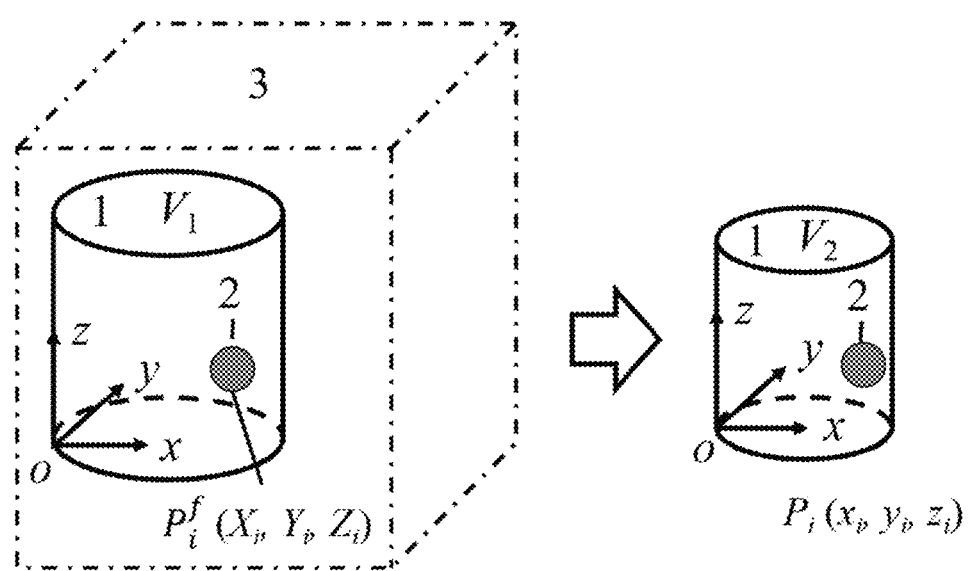
FIG. 3 schematically shows coordinates of a standard reference material according to an embodiment of the present disclosure.

As shown in FIG. 3, the initial powder of the transparent material 1 and the standard reference material 2 are placed in the synthesis mold 3, where the standard reference material $B_i$ is located at the placement coordinate position $P_i^f$, where $X_i$, $Y_i$ and $Z_i$ are respectively the x-coordinate value, y-coordinate value and z-coordinate value of the placement coordinate position.

In this embodiment, the initial powder of the transparent material 1 and the standard reference material 2 are placed in the synthesis mold 3, where the standard reference materials $B_1$, $B_2$ and $B_3$ are located at the placement coordinate positions $P_1^f$, $P_2^f$ and $P_3^f$, respectively. The synthesis mold 3 is placed into the synthesis cavity of a domestic cubic press, and the transparent material 1 containing three spherical standard reference materials 2 was synthesized by heat preservation for 15 min under a sintering pressure of 5.5 GPa and a sintering temperature of 1200° C.

(S5) Internal stress of the transparent material is detected.

Figure 4:
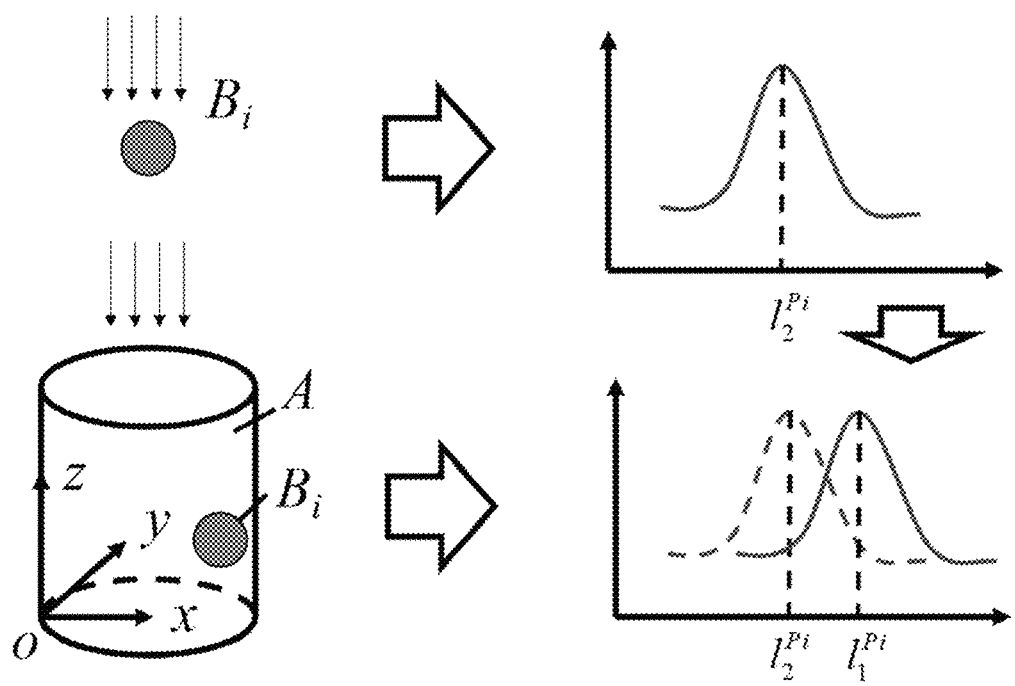
FIG. 4 schematically shows internal stress detection of the transparent material according to an embodiment of the present disclosure.

As shown in FIG. 4, $l_1^{Pi}$ represents the offset peak position on the spectrum of the standard reference material 2 at the detection coordinate position $P_i$ on the transparent material 1, which is detected by the X-ray diffractometer. $l_2^{Pi}$ represents the original peak position on the spectrum of the standard reference material 2, which is detected by the X-ray diffractometer.

Specifically, the X-ray diffractometer is used to detect the spectra of the standard reference material 2 located at positions $P_1$ (1, 0, 0.5), $P_2$ (1, 0, 1), and $P_3$ (1, 0, 1.5) inside the transparent material 1, corresponding to the offset peak positions of $l_1^{P1}$=696.2 nm, $l_1^{P2}$=695.4 nm, and $l_1^{P3}$=696.1 nm, respectively. The standard reference materials $B_1$, $B_2$, and $B_3$ are detected by the X-ray diffractometer, where the corresponding original peaks of the standard reference materials $B_1$, $B_2$, and $B_3$ are at positions of $l_2^{P1}$=$l_2^{P2}$=$l_2^{P3}$=694.2 nm.

The linear peak offset of the platinum standard reference materials $B_1$, $B_2$, and $B_3$ under per pressure is $\beta_1$=$\beta_2$=$\beta_3$=2740 MPa/nm, and the internal stresses at the detection coordinates $P_1$, $P_2$, and $P_3$ on the transparent material 1 respectively are:

$$p_{P1} = |(694.2 - 696.2)| \times 2740 = 5480 \text{ MPa};$$

$$p_{P2} = |(694.2 - 695.4)| \times 2740 = 3288 \text{ MPa; and}$$

$$p_{P3} = |(694.2 - 696.1)| \times 2740 = 5206 \text{ MPa}.$$

In the method provided by the present disclosure, based on the characteristic that the internal stress at a position within the material is the same as the pressure load on the standard reference material at that position, combining with the light transmittance of the material, the pressure on the standard reference material is detected via the X-ray diffraction method, thereby realizing the detection of the internal stress at an arbitrary position of the transparent material. The method provided herein has the characteristics of high measurement precision, accurate measurement of the spatial position, and convenient measurement, and thus facilitates the nondestructive detection of the internal stress of the transparent material.

The technical solutions and beneficial effects of the present disclosure have been described in detail through the above-described embodiments. It should be understood that the above-described embodiments are only illustrative of the present disclosure, and are not intended to limit the present disclosure. Any modifications, additions, and equivalent substitutions made within the principles of the present disclosure should be included in the scope of the present disclosure defined by the appended claims.

What is claimed is:

1. A method of detecting an internal stress distribution of a transparent material based on an X-ray diffraction, comprising:

(S1) establishing coordinates of stress detection positions of a transparent material through steps of:

establishing a spatial rectangular coordinate system o-x-y-z with an origin o being located at a surface of the transparent material, wherein a number of the stress detection positions is n; and under the spatial rectangular coordinate system, coordinates of an $i^{th}$ stress detection position $P_i$ are represented by $(x_i, y_i, z_i)$, wherein i=1, 2, 3, . . . , n;

(S2) pre-processing an initial powder of the transparent material and a standard reference material $B_i$;

(S3) calculating a placement coordinate position of the standard reference material $B_i$ on the transparent material through steps of:

placing the initial powder of the transparent material in a synthesis mold;

determining, using an Archimedes drainage method, a volume $V_1$ of the initial powder of the transparent material contained in the synthesis mold and a volume $V_2$ of the transparent material after being sintered, wherein a sintering shrinkage of the transparent material is expressed by:

$$\alpha = \frac{V_2}{V_1};$$

and setting the placement coordinate position of the standard reference material $B_i$ at the $i^{th}$ stress detection position $P_i$ as $P_i^f$ expressed by $(X_i, Y_i, Z_i)$; wherein $X_i=\alpha/x_i$, $Y_i=\alpha/y_i$, and $Z_i=\alpha/z_i$;

(S4) synthesizing a standard reference material-containing transparent material through steps of:

loading the initial powder of the transparent material and the standard reference material $B_i$ in the synthesis mold, wherein the standard reference material $B_i$ is located at $P_i^f$; and transferring the synthesis mold to a sintering device for sintering to synthesize the standard reference material-containing transparent material; and (S5) detecting a pressure of the standard reference material $B_i$ in the standard reference material-containing transparent material using an X-ray diffraction as an internal stress $p_{P_i}$ of the standard reference material-containing transparent material at $P_i$ through steps of:

determining a pressure load of the standard reference material $B_i$ located at the $i^{th}$ stress detection position $P_i$ in the standard reference material-containing transparent material as the internal stress of the standard reference material-containing transparent material at the $i^{th}$ stress detection position $P_i$; and measuring a spectrum of the standard reference material $B_i$ located at the $i^{th}$ stress detection position $P_i$ on the standard reference material-containing transparent material using an X-ray diffractometer, wherein a corresponding shifted peak position is represented by $l_1^{P_i}$;

measuring a spectrum of the standard reference material $B_i$ using the X-ray diffractometer, wherein a corresponding original peak position is represented by $l_2^{P_i}$; and calculating the internal stress $p_{P_i}$ of the standard reference material-containing transparent material at the $i^{th}$ stress detection position $P_i$ through the following formula:

$$p_{P_i} = \left| (l_2^{P_i} - l_1^{P_i}) \right| \times \beta_i;$$

wherein $\beta_i$ represents a linear shift of an original peak of the standard reference material $B_i$ under a unit pressure.

2. The method of claim 1, wherein in step (S2), the initial powder of the transparent material and the standard reference material $B_i$ are pre-processed through steps of:

processing the initial powder of the transparent material and the standard reference material $B_i$ respectively with an anhydrous ethanol, followed by removal of a waste liquid and drying.

3. The method of claim 2, wherein the transparent material is selected from the group consisting of diamond, quartz, aluminum oxide, and stishovite.

4. The method of claim 2, wherein the standard reference material $B_i$ is selected from the group consisting of ruby, platinum, and gold.

5. The method of claim 2, wherein a volume of the standard reference material $B_i$ is 1 $\mu m^3$-1 $mm^3$.

\* \* \* \* \*